(12) United States Patent
Sathe et al.

(10) Patent No.: US 11,275,974 B2
(45) Date of Patent: Mar. 15, 2022

(54) RANDOM FEATURE TRANSFORMATION FORESTS FOR AUTOMATIC FEATURE ENGINEERING

(71) Applicant: INTERNATIONAL BUSINESS MACHINES CORPORATION, Armonk, NY (US)

(72) Inventors: Saket Sathe, Mohegan Lake, NY (US); Deepak S. Turaga, Elmsford, NY (US); Horst Cornelius Samulowitz, White Plains, NY (US); Charu C. Aggarwal, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 850 days.

(21) Appl. No.: 16/133,583

(22) Filed: Sep. 17, 2018

(65) Prior Publication Data

US 2020/0090010 A1 Mar. 19, 2020

(51) Int. Cl.
*G06K 9/22* (2006.01)
*G06F 16/90* (2019.01)
*G06K 9/62* (2022.01)
*G06F 16/901* (2019.01)
*G06N 20/00* (2019.01)

(52) U.S. Cl.
CPC ....... *G06K 9/6282* (2013.01); *G06F 16/9027* (2019.01); *G06K 9/6232* (2013.01); *G06N 20/00* (2019.01)

(58) Field of Classification Search
CPC . G06K 9/6282; G06K 9/6232; G06F 16/9027
USPC .......................................................... 706/12
See application file for complete search history.

(56) References Cited

U.S. PATENT DOCUMENTS

| 6,009,199 A | 12/1999 | Ho |
| 7,644,049 B2 | 1/2010 | Bradski |
| 9,747,527 B2 | 8/2017 | Baranowski et al. |
| 2009/0281981 A1 | 11/2009 | Chen et al. |
| 2015/0379426 A1* | 12/2015 | Steele .................... G06N 20/00 706/12 |

OTHER PUBLICATIONS

Bryll et al., "Attribute bagging: improving accuracy of classifier ensembles by using random feature subsets," Pattern Recognition, 36, 2003 (12 pages).

(Continued)

*Primary Examiner* — Jeffery A Williams
(74) *Attorney, Agent, or Firm* — Griffiths & Seaton PLLC

(57) ABSTRACT

Embodiments for automated feature engineering by one or more processors are described. One or more selected transformations may be applied to a set of features in a dataset to create a set of transform features using random feature transformation forest (RFTF) classifiers. A transform feature may be selected from the set of transform features having a highest discriminative power as compared to other features of the set of transform features. At each node in a decision tree, store the selected feature, a split value, and the one or more selected transformations for the transform feature.

20 Claims, 10 Drawing Sheets

(56) References Cited

OTHER PUBLICATIONS

Kanter et al., "Deep Feature Synthesis: Towards Automating Data Science Endeavors," IEEE International Conference on Data Science and Advanced Analytics (DSAA), 2015 (10 pages).
Khurana et al., "Feature Engineering for Predictive Modeling using Reinforcement Learning," https://arxiv.org/abs/1709.07150, Sep. 21, 2017 (8 pages).
Sathe et al., "Similarity Forests," In Proceedings of the 23rd ACM SIGKDD International Conference on Knowledge Discovery and Data Mining (KDD '17), ACM, 2017 (9 pages).
Vens et al., "Random Forest Based Feature Induction," 2011 11th IEEE International Conference on Data Mining, 2011 (10 pages).

\* cited by examiner

Random Forest: Training Phase

- Random forest is composed of $E$ decision trees
- Assume a *labelled* set of data points with n points and $i = 1, ..., d$ features

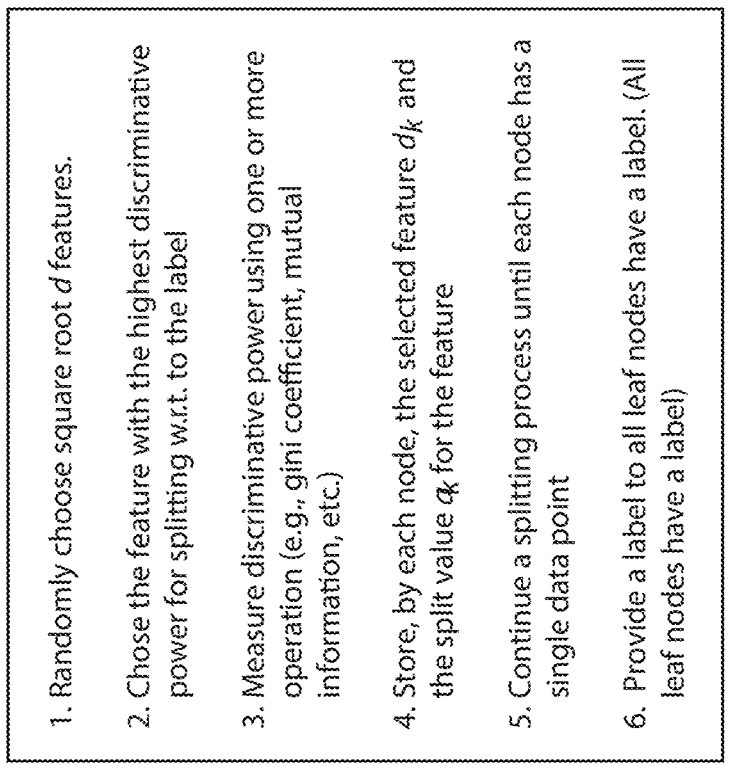

1. Randomly choose square root $d$ features.
2. Chose the feature with the highest discriminative power for splitting w.r.t. to the label
3. Measure discriminative power using one or more operation (e.g., gini coefficient, mutual information, etc.)
4. Store, by each node, the selected feature $d_k$ and the split value $q_k$ for the feature
5. Continue a splitting process until each node has a single data point
6. Provide a label to all leaf nodes have a label. (All leaf nodes have a label)

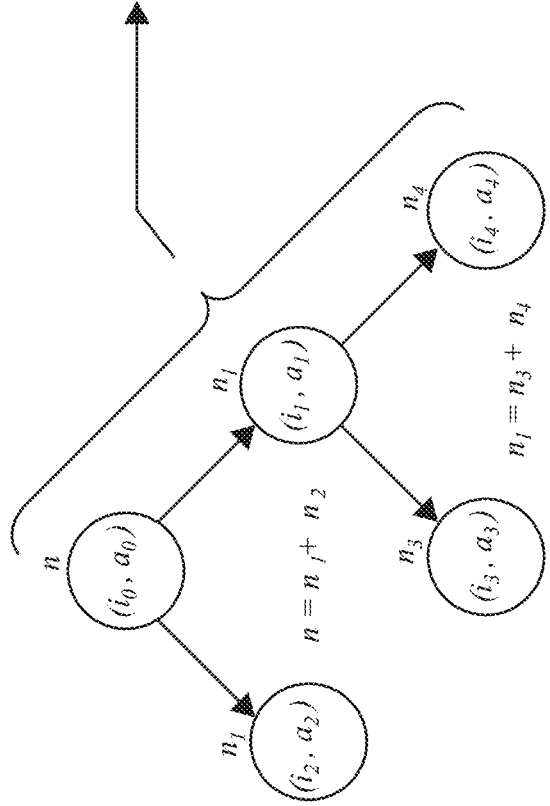

| Dataset | Random Forest (accuracy %) | Random Feature Transformation Forest (accuracy %) |
|---|---|---|
| Dataset 1 | 66.6% | 70.0% |
| Dataset 2 | 90.1% | 91.6% |
| Dataset 3 | 95.4% | 96.5% |
| Dataset 4 | 74.6% | 96.5% |

FIG. 7

RANDOM FEATURE TRANSFORMATION FORESTS FOR AUTOMATIC FEATURE ENGINEERING

BACKGROUND OF THE INVENTION

Field of the Invention

The present invention relates in general to computing systems, and more particularly, to various embodiments for random feature transformation forests for automatic feature engineering.

Description of the Related Art

Feature engineering is the task of improving predictive modeling performance on a dataset by transforming its feature space. Existing approaches to automate this process typically rely on either transformed feature space exploration through evaluation-guided search or explicit expansion of datasets with all transformed features followed by feature selection. Such approaches incur high computational costs with respect to runtime and/or memory.

SUMMARY OF THE INVENTION

Various embodiments for automated feature engineering by one or more processors are described. One or more selected transformations may be applied to a set of features in a dataset to create a set of transform features using random feature transformation forest (RFTF) classifiers. A transform feature may be selected from the set of transform features having a highest discriminative power as compared to other features of the set of transform features. At each node in a decision tree, the selected feature, a split value, and the one or more selected transformations for the transform features may be stored.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4A-4B are diagrams of a representation of operations of a random forest in a training phase and testing phase according to an embodiment of the present invention;

FIG. 7 is a table showing statistics of application of random forest and random feature transformation forest (RFTF) samples on datasets.

DETAILED DESCRIPTION OF THE DRAWINGS

Figure 1:
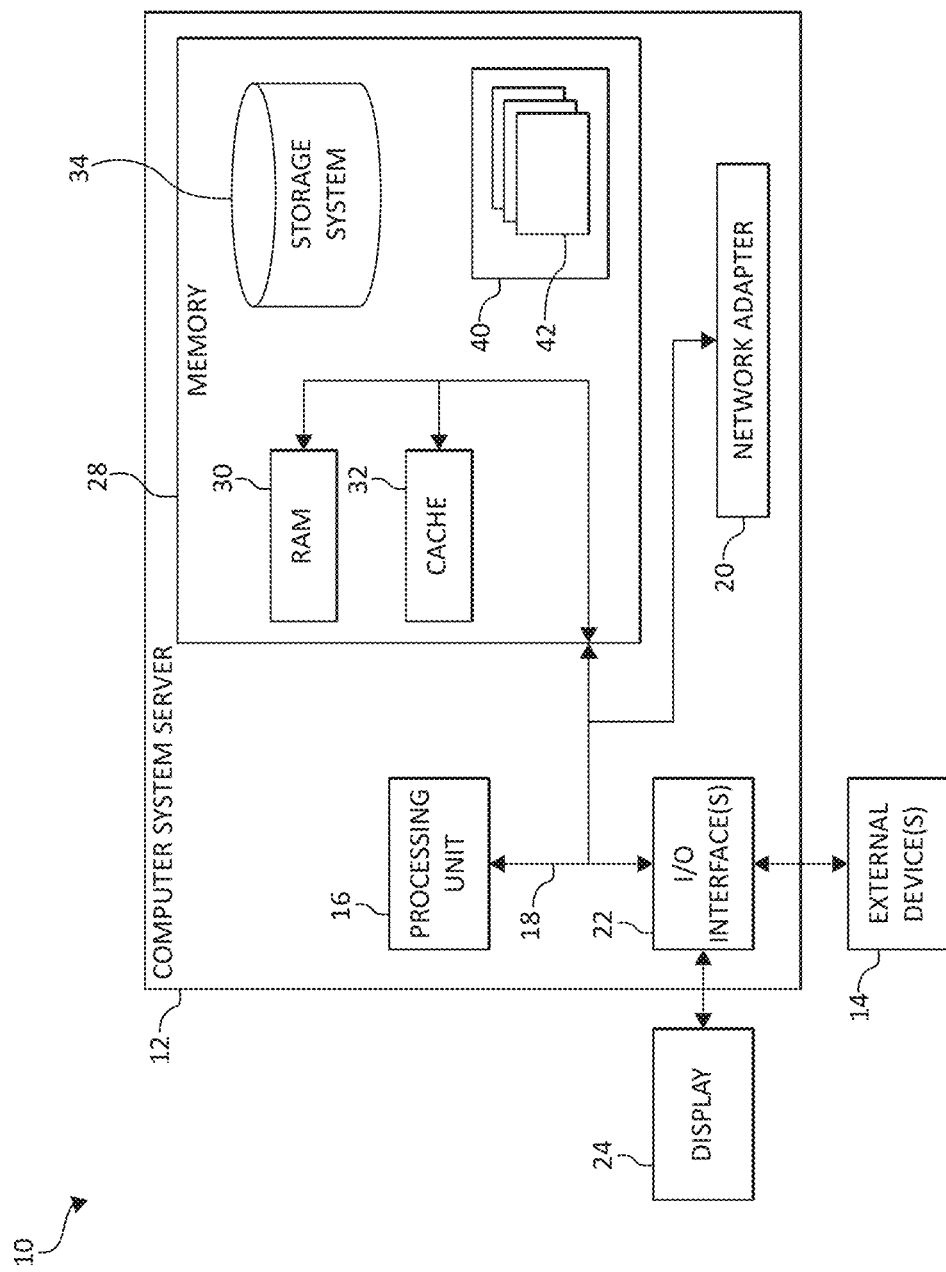
FIG. 1 is a block diagram depicting an exemplary computing node according to an embodiment of the present invention.

Feature engineering is a central task in data preparation for machine learning. It is the practice of constructing suitable features from given features that lead to improved predictive performance. The process involves the application of transformation functions, such as arithmetic and aggregate operators, on given features to generate new ones. Transformations help scale a feature or convert a non-linear relation between a feature and a target class into a linear relation, which is easier to learn.

Feature engineering is usually conducted by data scientists relying on their domain expertise and iterative trial and error and model evaluation. The automated feature engineering, requires on-the-fly feature generation where random forests classifiers may be used. Random forest (RF) or random decision forests are an ensemble learning operation for classification, regression, and/or other tasks that operate by constructing a multitude of decision trees at training time and outputting a class that is the mode of the classes (e.g., classification) or mean prediction (e.g., regression) of the individual trees.

In random forests, each tree in the ensemble is built from a sample drawn with replacement (for example, a bootstrap sample) from the training set. When splitting a node during the construction of the tree, the split that is chosen is no longer the best split among all features. Instead, the split that is picked is the best split among a random subset of the features. Because of this randomness, the bias of the forest usually slightly increases (with respect to the bias of a single non-random tree) but, due to averaging, its variance also decreases, usually more than compensating for the increase in bias, hence yielding an overall better model.

Simply stated, the RF are a non-parametric ensemble approach to machine learning that uses bagging to combine the decisions of multiple classification trees to classify data samples. The RF may correct for a decision trees' habit of overfitting to a training set. It should be noted that overfitting may be defined as the production of an analysis that corresponds too closely or exactly to a particular set of data and may therefore fail to fit additional data or predict future observations reliably. Underfitting occurs when a statistical model in unable to adequately capture the underlying structure of the data. Both overfitting and underfitting may occur in machine learning.

However, one of the challenges with RF is that the feature space of the RF is restricted to the original features present in the data. This often leads to a limited scope for exploration at a given split node of the decision tree in the RF. This is because a split point has to be chosen from the features given to the forest. One option is to generate additional features from the original features as a pre-processing step and simply give the larger feature set to the RF. However, this approach is impractical when the data sets already have a high number of features and possible transformation will explode the number of features.

In view of the foregoing, a need exists for methods and systems that provide feature generation occurring on-the-fly using random feature transformation forests (RFTF) for automatic, feature engineering for classification.

To address these needs, embodiments described herein provide methods and systems for performing on-the-fly feature generation using random forest classifiers for automatic feature engineering for classification. One or more selected transformations may be applied to a set of features in a dataset to create a set of transform features using random feature transformation forest (RFTF) classifiers. A transform feature may be selected from the set of transform features having a highest discriminative power as compared to other features of the set of transform features. At each node in a decision tree, the selected feature, a split value, and the one or more selected transformations for the transform feature may be stored.

In an additional aspect, various methods and/or systems described herein, provide for automatically constructing features for a classification/regression problem where the data set is given and has a base set of features. A target variable that a classification problem attempts to predict is provided. A set of transformations may be applied to the data to create new features using an RFTF operation to construct an ensemble classifier/regressor that constructs new features on-the-fly and as an integrated part of a machine learning process.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, network PCs, and servers. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
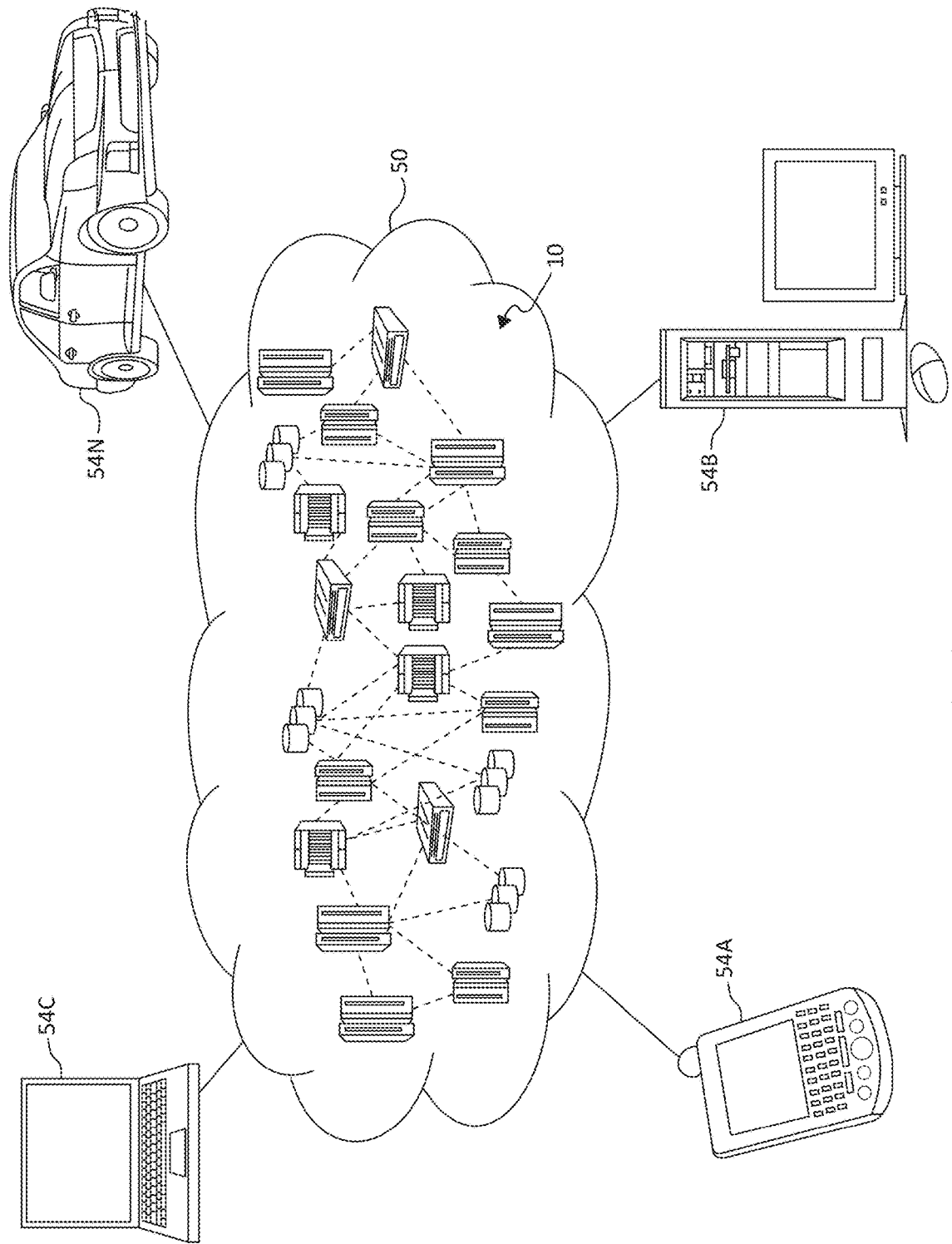
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
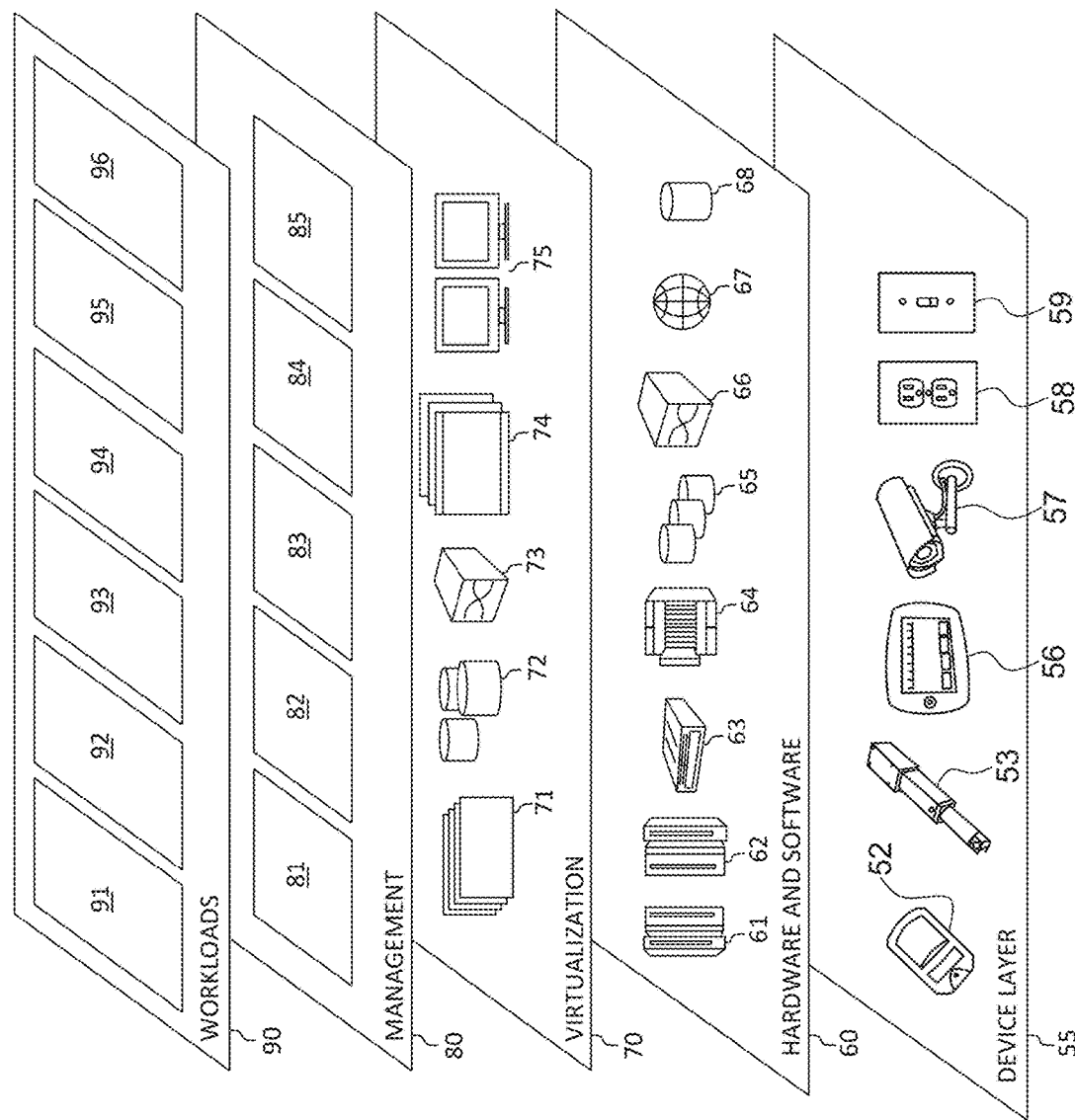
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automatic feature engineering as described herein. One of ordinary skill in the art will appreciate that the workloads and functions 96 for automatic feature engineering may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for automatic feature engineering by one or more processors. One or more selected transformations may be applied to a set of features in a dataset to create a set of transform features using random feature transformation forest (RFTF) classifiers. A transform feature may be selected from the set of transform features having a highest discriminative power as compared to other features of the set of transform features. At each node in a decision tree, the selected feature, a split value, and the one or more selected transformations for the transform feature may be stored.

Figure 4B:
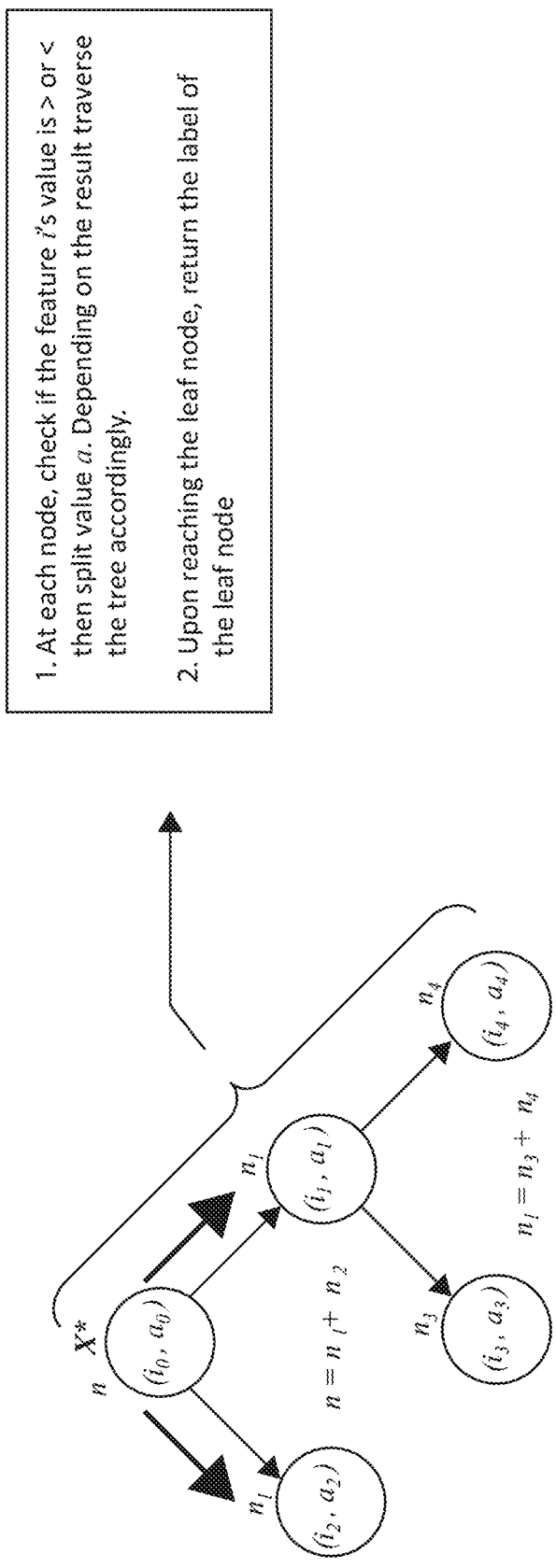

Turning now to FIGS. 4A-4B, a representation of operations of a random forest 400 in a training phase and a representation of operations of a random forest 425 in a testing phase are depicted. As a preliminary matter, random forests 400 and 425 may be ensemble-centric classifiers. The ensemble-centric classifiers may: step 1) build several unstable (e.g., overfitted or "high variance) models from subsets of data or the features, step 2) predict a label for each test point using all the models learned from step 1, and step 3) combine the different score and output a final result. The combining of the different scores may be performed using one of a variety of methods such as, for example, averaging the scores or take a majority vote (if the scores are binary labels). Also, the final result output may result in a variance reduction leading to a smooth decision boundary.

Random forests 400 and 425 may be composed of E decision trees and a labelled set of data points with n (e.g., n={$n_1, \ldots, n_n$} points with i=1 and a dataset with d features (e.g., I varies between 1, . . . , d and is the index of the features present in the dataset). To illustrate, the following steps use the RF 400 during the training phase. In step 1) a square root of d features ("$\sqrt{d}$") may be randomly selected. In step 2) a feature with a highest discriminative power (e.g., accuracy) for splitting with respect to the label may be selected. In step 3) one or more operations/methods may be applied to measure the discriminative power such as, for example, gini coefficient, mutual information, etc. In step 4) the selected feature $d_k$ and the split value $a_k$ for the feature may be stored. In step 5) the splitting processes may be continued until each node have a single data point (e.g., points $n_{1-4}$). In step 6) each node may be provided/have a label.

Turning now to the random forest 425 in a testing phase in FIG. 4B, assume there is a text point X* and a label prediction may be obtained from each of the E decision trees. That is, the prediction of a test point X* may be obtained from only one decision tree and/or be obtained from each of the E decision trees. The final prediction for the text point X* can be obtained by either majority voting on these predictions or by averaging the predictions. The choice of majority voting as compared with averaging the predictions depends on the type of the class label. If the class label is categorical (e.g., typical for classification problems) then majority voting may be used, and if it is a continuous label (e.g., typical for regression problems) then averaging the predictions may be used.

The prediction of the label may be averaged or a majority vote to generate a final prediction label. More specifically, the testing phase may include the following steps. In step 1) at each node, a determination operation is performed to determine (e.g., check) if the features i's value is greater than (">") and/or less than ("<") the split value $a_k$ (e.g., $a=\{a_1, \ldots, a_k\}$. That is, if the features i's value is greater than (">") the split value $a_k$, the operation may go down the tree in one direction (e.g., left side of the tree). Alternatively, if the features i's value is less than ("<") the split value $a_k$, the operation may go down the tree in an alternative direction (e.g., rights side of the tree). In step 2) a label may be may be returned upon reaching a leaf node.

Figure 5A:
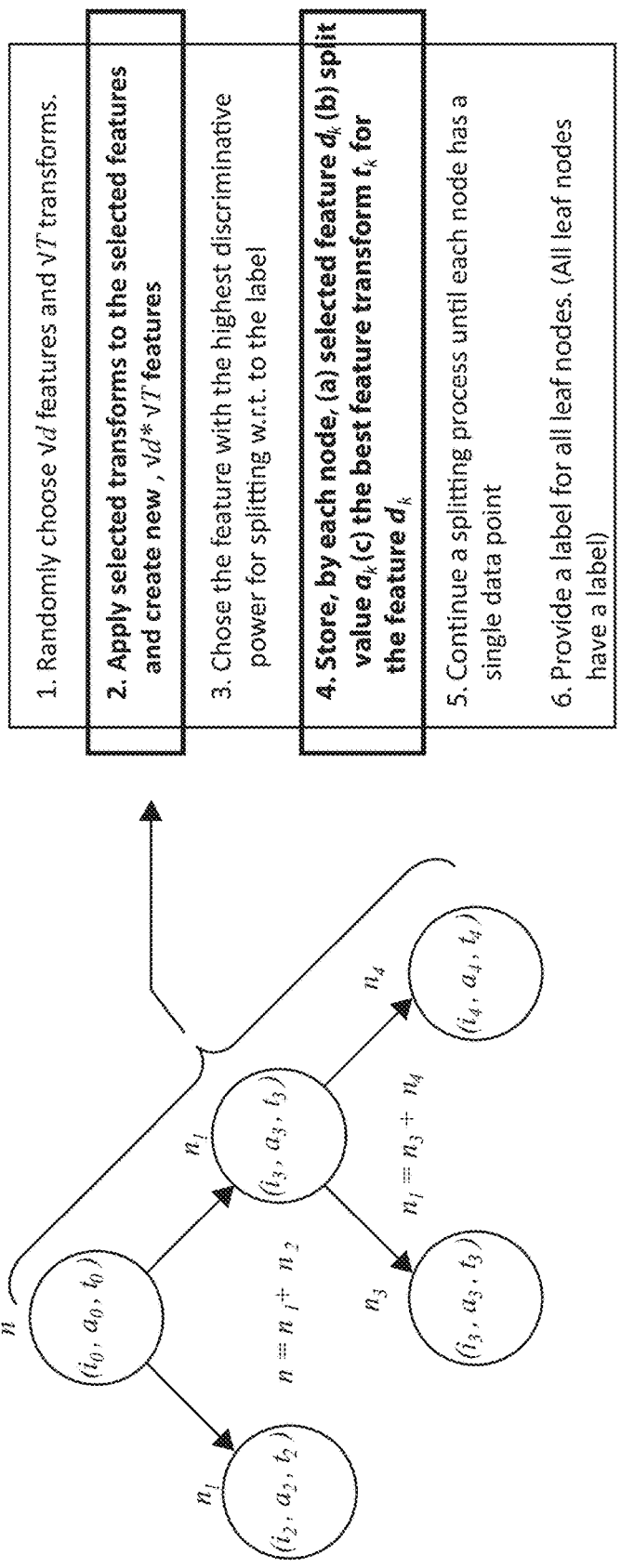
FIG. 5A-5B are diagrams of a representation of operations of a random feature transformation forest (RFTF) in a training phase and testing phase according to an embodiment of the present invention.
Figure 5B:
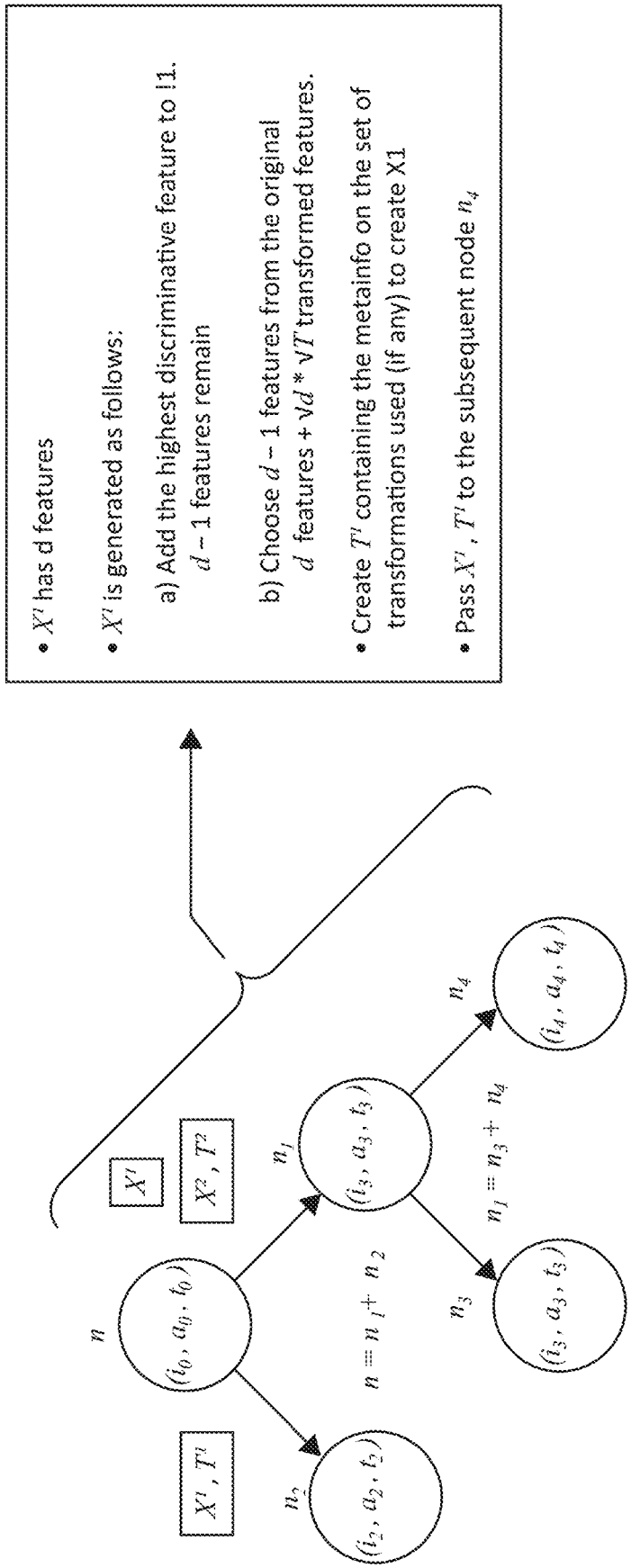

FIG. 5A-5B are diagrams of a representation of operations of a random feature transformation forest (RFTF) in a training phase and testing. Similar to the discussion of FIGS. 4A-4B, Random forests 500 and 525 may be composed of E decision trees and a labelled set of data points with n (e.g., $n=\{n_1, \ldots, n_n\}$ points with i=1 and a dataset with d features. However, there may also be a set of transformations T= $\{T_1, \ldots, T_m\}$ to select for applying the d features.

To illustrate, the following steps using the RFTF 500 during the training phase may be applied. In step 1) a square root ("$\sqrt{d}$") of d features and a square root ("$\sqrt{T}$") of may be randomly selected. In step 2) the selected transforms (e.g., randomly selected) may be applied to the selected features (e.g., randomly selected) to create a new set of transform features (e.g., create a square root ("$\sqrt{d}$") of d features multiplied by square root ("$\sqrt{T}$")). That is, one or more selected transformations may be applied to a set of features in a dataset to create a set of transform features using RFTF classifiers.

In step 3) a feature (e.g., a transform feature) with a highest discriminative power (e.g., accuracy or highest predictive performance) for splitting with respect to the label may be selected. In step 4) storing at each node in the decision tree (e.g., the RFTF) the selected feature $d_k$, a split value $a_k$, and the one or more selected transformations $t_k$ for the selected feature $d_k$. In step 5) the splitting processes may be continued until each node have a single data point (e.g., points $n_{1-4}$). In step 6) each node may be provided/have a label.

Turning now to FIG. 5B, the RF 525 and a composite transform is illustrated in a testing phase in FIG. 5B. In one aspect, each node refers to an original data set and does not allow composition of transforms. Assume there is a text point X* and obtaining a label prediction from each of the E decision trees.

As illustrated, $X^1$ has d features. $X^1$ may be generated by: a) adding a highest discriminative feature to $X^1$, where d−1 remain, and b) d−1 features may be selected from the original d features plus the square root ("$\sqrt{d}$") of d features and a square root ("$\sqrt{T}$") transform features. $T^1$ may be created containing the meta data (e.g., metainfo) on a set of transformations used (if any) to create $X^1$. $X^1$ and $T^1$ may be passed to the subsequent node such as, for example, $n_2$ (e.g., pass the one or more selected transforms that are used to create the set of transform features to one or more child nodes).

Figure 6:
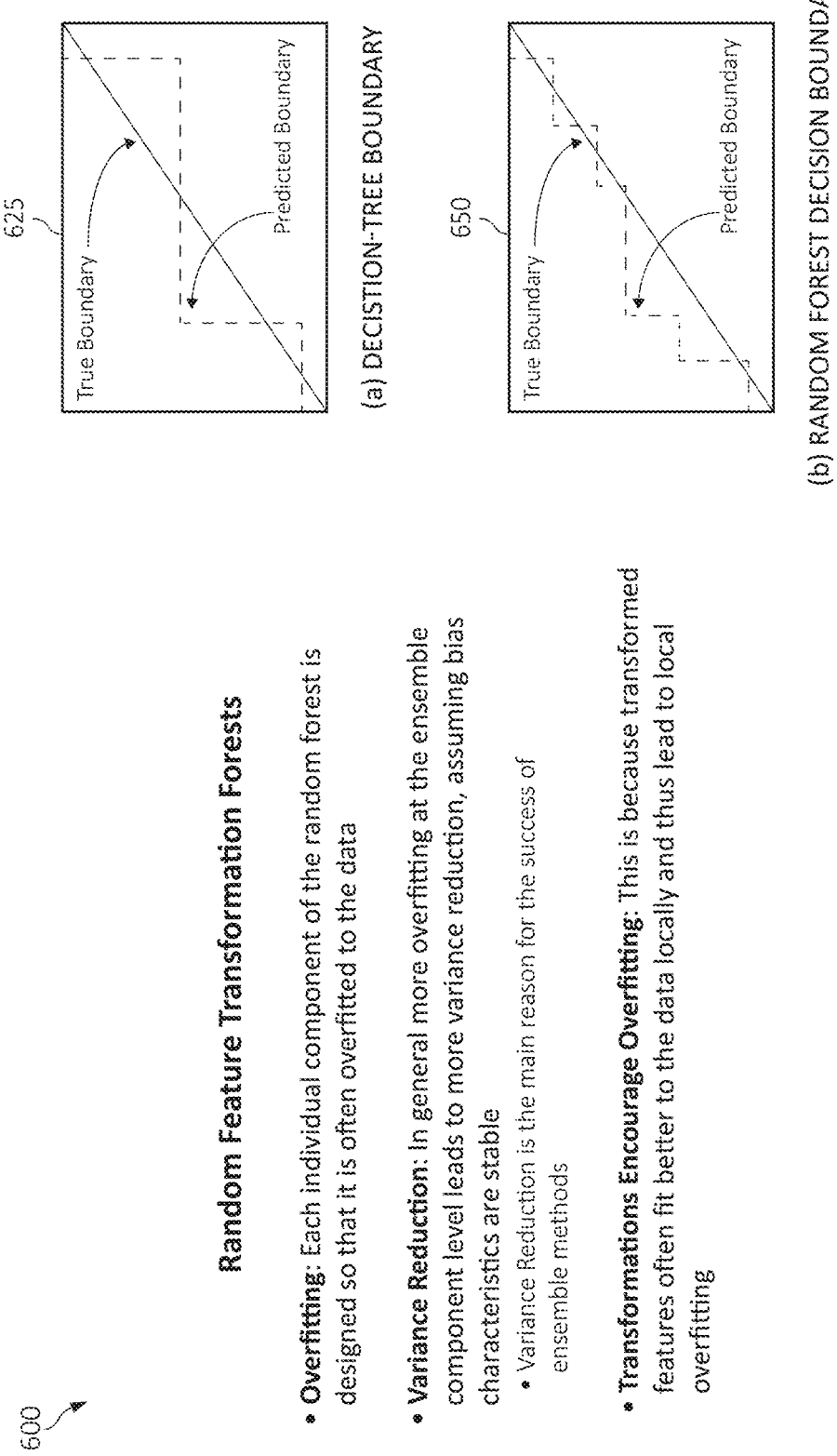
FIG. 6 is a block diagram depicting decision boundaries according to an embodiment of the present invention

Turning now to FIG. 6, a block diagram depicting decision boundaries such as, for example, (a) decision-tree boundary 625, and (b) random forest decision boundary 650. The true boundary may be observed via the line and the predicted boundary may be observed via the dashed line. More specifically, the RFTF provide enhancements other classifiers such as for overfitting, variance reduction, and/or the transformations encourage overfitting. For overfitting, each individual component of the random forest may be designed so that it is overfitted to the data. For variance reduction, more overfitting at the ensemble component level leads to more variance reduction, assuming bias characteristics are stable. Also, the transformations encourage overfitting because transformed features often fit better to the data locally and thus lead to local overfitting. That is, each node of a decision tree is assigned a subset of the data points. Thus, a node has a "local" view of the entire data set and therefore is responsible for "locally overfitting" the data. Thus, overfitting is an encouraged characteristic of a random forest, and RFTF encourages overfitting even further.

Thus, each decision tree (e.g., (a) decision-tree boundary 625, and (b) random forest decision boundary 650) overfits the data. The decision boundary is usually less smooth, as in decision-tree boundary 625. When a large number of such rough decision boundaries obtained from various decision trees are averaged, a smooth decision boundary is obtained, as in random forest decision boundary 650. Thus, increasing the overfitting in an individual decision tree leads to a more accurate/smoother decision boundary when the boundaries are averaged. The transformations simply encourage overfitting and thus are a key component for improving overall performance (accuracy). It should be noted that transformations may be used to reveal and improve significant correlation or discriminative information between features and class labels. The more pronounced this correlation, the more likely it is that the model will achieve significant predictive performance.

FIG. 7 is a table showing statistics of application of random forest and random feature transformation forest (RFTF) samples on datasets. Table 700 depicts datasets 1-4. Each data set X (e.g., dataset X1-X4) may be divided for testing and training. That is, the machine learning operation may divide the dataset into train data and test data. An 80-20 split may be used (e.g., 80% of the data points are used for training, while 20% are used for testing). The machine learning models are trained using only the training data, while performance of how well the training model is doing is measured using the test data. The test data is not used for training the models. The accuracy (e.g., a performance metric for measuring a degree of certainty) is reported on the test set. A baseline random forest algorithm on X. Polynomial features of degree 2 may be added to X creating dataset X'. As such, executing the random forest on the X' is almost equivalent to executing the random feature transformation forest X'.

Figure 8:
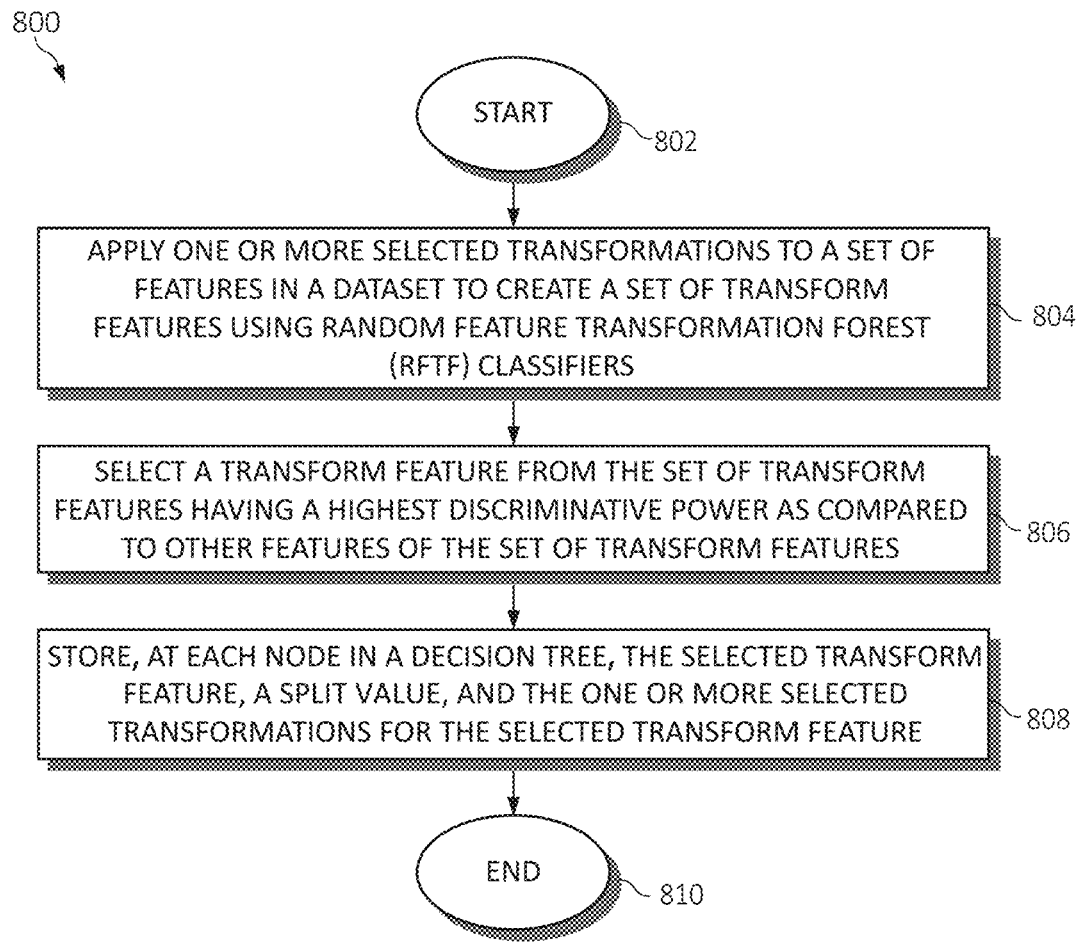
FIG. 8 is a flowchart diagram depicting an exemplary method for automatic feature engineering in which various aspects of the present invention may be implemented.

Turning now to FIG. 8, a method 800 for automatic feature engineering by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

One or more selected transformations may be applied to a set of features in a dataset to create a set of transform features using random feature transformation forest (RFTF) classifiers, as in block 804. A transform feature may be selected from the set of transform features having a highest discriminative power as compared to other features of the set of transform features, as in block 806. At each node in a decision tree, the selected feature, a split value, and the one or more selected transformations for the transform feature may be stored, as in block 808.

In one aspect, in conjunction with and/or as part of at least one block of FIG. 8, the operations of method 800 may include each of the following. The operations of method 800 may randomly select the one or more selected transformations and the set of features. A plurality of a selected number of random feature transformation trees may be used. Each of the selected number of random feature transformation trees may be enabled to predict a label for a test data point. Also, each of the selected number of random feature transformation trees may be defined as having a set of nodes, wherein each node includes two child nodes.

The operations of method 800 may split training data at a root node of the decision tree by sampling the set of features from the dataset and the one or more selected transformations. The operations of method 800 may pass the one or more selected transforms that are used to create the set of transform features to one or more child nodes, and apply the one or more selected transformations to both the set of features in the dataset and the transform feature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for automated feature engineering, comprising:
    applying one or more selected transformations to a set of features in a dataset to create a set of transform features using random feature transformation forest (RFTF) classifiers;
    selecting a transform feature from the set of transform features having a highest discriminative power as compared to other features of the set of transform features; and
    storing at each node in a decision tree the selected transform feature, a split value, and the one or more selected transformations for the selected transform feature.

2. The method of claim 1, further including randomly selecting the one or more selected transformations and the set of features.

3. The method of claim 1, further including using a plurality of a selected number of random feature transformation trees, wherein each of the selected number of random feature transformation trees are enabled to predict a label for a test data point.

4. The method of claim 3, further including defining each of the selected number of random feature transformation trees as having a set of nodes, wherein each node includes two child nodes.

5. The method of claim 1, further including splitting training data at a root node of the decision tree by sampling the set of features from the dataset and the one or more selected transformations.

6. The method of claim 1, further including passing the one or more selected transforms that are used to create the set of transform features to one or more child nodes.

7. The method of claim 1, further including applying the one or more selected transformations to both the set of features in the dataset and the transform feature.

8. A system for automated feature engineering, comprising:
    one or more computers with executable instructions that when executed cause the system to:
        apply one or more selected transformations to a set of features in a dataset to create a set of transform features using random feature transformation forest (RFTF) classifiers;
        select a transform feature from the set of transform features having a highest discriminative power as compared to other features of the set of transform features; and
        store at each node in a decision tree the selected transform feature, a split value, and the one or more selected transformations for the selected transform feature.

9. The system of claim 8, wherein the executable instructions further randomly select the one or more selected transformations and the set of features.

10. The system of claim 8, wherein the executable instructions use a plurality of a selected number of random feature transformation trees, wherein each of the selected number of random feature transformation trees are enabled to predict a label for a test data point.

11. The system of claim 10, wherein the executable instructions define each of the selected number of random feature transformation trees as having a set of nodes, wherein each node includes two child nodes.

12. The system of claim 8, wherein the executable instructions split training data at a root node of the decision tree by sampling the set of features from the dataset and the one or more selected transformations.

13. The system of claim 8, wherein the executable instructions pass the one or more selected transforms that are used to create the set of transform features to one or more child nodes.

14. The system of claim 8, wherein the executable instructions apply the one or more selected transformations to both the set of features in the dataset and the transform feature.

15. A computer program product for feature engineering by one or more processors, the computer program product comprising a non-transitory computer-readable storage medium having computer-readable program code portions stored therein, the computer-readable program code portions comprising:
    an executable portion that applies one or more selected transformations to a set of features in a dataset to create a set of transform features using random feature transformation forest (RFTF) classifiers;
    an executable portion that selects a transform feature from the set of transform features having a highest discriminative power as compared to other features of the set of transform features; and
    an executable portion that stores at each node in a decision tree the selected transform feature, a split value, and the one or more selected transformations for the selected transform feature.

16. The computer program product of claim 15, further including an executable portion that randomly selects the one or more selected transformations and the set of features.

17. The computer program product of claim 15, further including an executable portion that:
    uses a plurality of a selected number of random feature transformation trees, wherein each of the selected number of random feature transformation trees are enabled to predict a label for a test data point; and
    defines each of the selected number of random feature transformation trees as having a set of nodes, wherein each node includes two child nodes.

18. The computer program product of claim 15, further including an executable portion that splits training data at a root node of the decision tree by sampling the set of features from the dataset and the one or more selected transformations.

19. The computer program product of claim 15, further including an executable portion that:
  passes the one or more selected transforms that are used to create the set of transform features to one or more child nodes; or
  applies the one or more selected transformations to both the set of features in the dataset and the transform feature.

20. The computer program product of claim 15, further including an executable portion that applies the one or more selected transformations to both the set of features in the dataset and the transform feature.

\* \* \* \* \*